United States Patent [19]

Rau

[11] Patent Number: 5,394,398
[45] Date of Patent: Feb. 28, 1995

[54] METHOD AND CIRCUIT ARRANGEMENT FOR THE TRANSMISSION OF MESSAGE CELLS WITHIN AN ATM NETWORK

[75] Inventor: Peter Rau, Munich, Germany

[73] Assignee: Siemens Aktiengesellschaft, Munich, Germany

[21] Appl. No.: 111,000

[22] Filed: Aug. 24, 1993

[30] Foreign Application Priority Data

Aug. 28, 1992 [EP] European Pat. Off. ........... 92114798

[51] Int. Cl.6 .......................... H04J 3/26; H04L 12/56
[52] U.S. Cl. ...................................... 370/60.1; 370/84; 370/94.1
[58] Field of Search ..................... 370/60, 60.1, 79, 80, 370/84, 94.1, 94.2, 94.3

[56] References Cited

U.S. PATENT DOCUMENTS

| | | | |
|---|---|---|---|
| 5,099,475 | 3/1992 | Kozaki et al. | 370/94.1 X |
| 5,204,882 | 4/1993 | Chao et al. | 370/94.2 X |
| 5,214,639 | 5/1993 | Herion | 370/60 |
| 5,317,561 | 5/1994 | Fischer et al. | 370/16 |

FOREIGN PATENT DOCUMENTS

| | | |
|---|---|---|
| 0355797 | 2/1990 | European Pat. Off. . |
| 0384936 | 9/1990 | European Pat. Off. . |
| 0471380 | 2/1992 | European Pat. Off. . |
| 0512141 | 11/1992 | European Pat. Off. . |

*Primary Examiner*—Melvin Marcelo
*Attorney, Agent, or Firm*—Hill, Steadman & Simpson

[57] ABSTRACT

The message cells of a virtual connection appear with a transmission bit rate that is higher in comparison to a transmission bit rate respectively defined for inputs (E1, ...,EP) and outputs (A1,...,AP) of an ATM network. These message cells are depacketed. The message signals contained in successive message cells are thereby subdivided into signal sections. Upon attachment of a continuously changing signal section sequence number, these are respectively inserted into the information part of a message cell. The message cells are then transmitted via different transmission routes within the ATM network and are subsequently depacketed. Based on the measure of the signal section sequence numbers contained in these message cells, message signals in the original length are in turn formed from the individual signal sections, these message signals being inserted into message signals of the appertaining virtual connection for forwarding.

9 Claims, 4 Drawing Sheets

METHOD AND CIRCUIT ARRANGEMENT FOR THE TRANSMISSION OF MESSAGE CELLS WITHIN AN ATM NETWORK

BACKGROUND OF THE INVENTION

The present invention is directed to a method and to a circuit arrangement for transmitting message cells within an ATM network.

A method for forwarding message cells, which have a cell headier identifying the respective virtual connection and which are transmitted on offering trunks during the course of virtual connections according to an asynchronous transfer method via cell switching equipment having at least two redundant switching matrices, to serving trunks is already known (European Patent Application 89 10 3798 corresponding to U.S. Ser. No. 08/040,913 filed Mar. 29, 1993). In this known method, a message cell-group having a plurality of identical message cells corresponding in number to the plurality of redundant switching matrices is formed by duplication for every one of the message cells transmitted on one of the offering trunks during the course of a virtual connection. An identical auxiliary identifier in the form of a continuously assigned message cell sequence number that changes for successive message cell groups is thereby entered into the cell header of each of the message cells of a message cell group. Subsequently, the message cells of a message cell group are separately transmitted via the redundant switching matrices in the direction of the serving trunk for the respective virtual connection. Finally, after such a transmission via the redundant switching matrices, only one of the message cells a message cell group is forwarded to the serving trunk coming into consideration. It is forwarded thereto on the basis of the auxiliary identifier respectively attached to the message cells.

Furthermore, a method has already been proposed (European Patent Application 91 10 7434 corresponding to U.S. Ser. No. 07/880,188 now U.S. Pat. No. 5,317,561 filed May 5, 1992) for switching message cells of a transmission system transporting a message cell stream according to an asynchronous transfer method via a switching network constructed with modules. The transport bit rate of the transmission system is a multiple of the transmission bit rate of the switching elements of the modules. Messages to be switched are thereby distributed onto a plurality of switching network inputs corresponding to the multiple, upon respective attachment of information. Such information identifies all those modules via which the message cells are to be through-connected to an output of the switching network. The message cells transmitted to various outputs are then recombined to form a message cell stream. What is thereby provided, among other things, is that a cyclically continuous sequence number is attached in call-associated fashion to the message cells before the through-connection through the switching network. The sequence of the message cells for every connection is assured on the basis of this sequence number in the combination to form the message cell stream. The message cells are cyclically distributed onto the switching network inputs.

SUMMARY OF THE INVENTION

It is an object of the present invention to provide a method and circuit arrangement for transmitting message cells occurring with a first transmission bit rate within an ATM (asynchronous transfer mode) network that is designed for a second transmission bit rate that is lower in comparison to the first transmission bit rate.

This object is achieved by a method of the present invention for transmitting message cells which are respectively formed of a cell header having an identifier of the respective virtual connection and of an information part. The message cells appear during the course of at least one virtual connection with a first transmission bit rate via an ATM network that operates according to an asynchronous transfer mode (ATM). The ATM network has a plurality of inputs and outputs, and at least one ATM communication means. The inputs and outputs are respectively designed for input and output, respectively, of message cells with a second transmission bit rate that is lower in comparison to the first transmission bit rate. The message signals contained in the message cells are subdivided into successive signal sections whose respective bit plurality is uniformly defined such that this plus a defined plurality of information bits corresponds to the plurality of bits transmittable in the information part of a message cell as a useful signal. The signal sections are successively inserted into the information parts of the message cells and a continuously changing signal section sequence number is thereby entered into the information parts as information bits. The message cells are successively distributed onto a plurality of inputs of the ATM network that corresponds to the bit rate ratio of the first transmission bit rate relative to the second transmission bit rate and are transmitted via the appertaining inputs to outputs of the ATM network allocated to these. The signal section respectively contained in the message cells appearing at the appertaining outputs as well as the signal section sequence number appertaining thereto are removed from the message cells appearing at the appertaining outputs. Message cells whose bit plurality is defined such that this respectively corresponds to the plurality of bits transmittable in the information part of a message cell as useful signals are formed from the sequence of the signal sections for the respective virtual connection. The message signals are subsequently successively inserted into message cells of the respective virtual connection and that are forwarded with the first transmission bit rate.

The method of the present invention thereby yields the advantage that message cells are first depacketed and the message signals contained in these are transmitted via a plurality of inputs of the ATM network signal section by signal section in the information parts of newly formed message cells. Auxiliary information in the form of signal section sequence numbers required for the recovery of the original message cells are thereby inserted exclusively into the information parts of the newly formed message cells, i.e. in the actual user field of these message cells. Thus these message cells have no modifications with respect to their respective cell header in comparison to the cell headers of the other message cells transmitted via the ATM network. As a result, no additional control outlay is required for the transmission of the original message cells within the ATM network. After a transmission of the message cells containing signal sections, on the contrary, a recovery of message cells that correspond to the original message cells both in terms of content as well as in terms of the sequence occurs exclusively on a user level. At the user level the signal section sequence numbers transmitted in the information fields of the newly formed message cells are evaluated.

An advantageous development of the method of the present invention is that check information, serving the purpose of a check of an error-free transmission as well as a length indicator for the length of the signal section contained in the respective information part, is entered into the information parts of the message cells as respective information bits. The check information is entered in addition to a signal section sequence number. The advantage of this development is that check information and length indicators attached to the signal section sequence numbers make it possible in a simple way to be able to identify transmission errors within the ATM network and the length of the respective signal section.

The above-cited object is achieved in a circuit arrangement for implementation of the present method that has an ATM network having at least one ATM communication equipment that is connected to at least one offering trunk, via which the message cells of at least one virtual connection can be transmitted with a first transmission bit rate. The ATM network is connected to at least one serving trunk for the forwarding of message cells with the first transmission bit rate. Internal inputs and outputs are designed for input and output, respectively, of message signals in the form of message cells containing a cell header and an information part with a transmission bit rate that is lower in comparison to the first transmission bit rate. At least one handling means is provided which is connected, first, to the respective offering trunk and, second, to a plurality of inputs of the ATM network which corresponds in number to a number corresponding to the bit rate ratio of the first transmission bit rate to the second transmission bit rate. The respective handling means has repacketing means individually allocated to the virtual connections available to it and to which the message cells of the appertaining virtual connection are respectively supplied. The respective repacketing means thereby depackets the message cells and forms signal sections from the sequence of message signals contained in the appertaining message parts. These signal sections, together with a signal section sequence number changing from signal section to signal section, are respectively inserted into the information part of a message cell. These message cells are distributed onto the appertaining internal inputs of the ATM network in a defined sequence. At least one evaluation means is provided which, first, is connected to the respective serving trunk and, second, is connected to a plurality of internal outputs of the ATM network that is allocated to the plurality of internal inputs and corresponds to the appertaining bit rate ratio. The evaluation means has call-associated repacketing means connected to the appertaining internal outputs. The respective repacketing means takes the signal section as well as the signal section sequence number respectively contained in the message cells supplied via the internal outputs from the message cells of the respective virtual connection supplied via the internal outputs and first intermediately stores the respective signal section in a random access memory under a write address corresponding to the appertaining signal section sequence number. Message signals are formed by the respective repacketing means from the sequence of the signal sections stored in the appertaining random access memory. The message signals are inserted into the information parts of message cells of the respective virtual connection forwarded to the respective serving trunk. The advantage of this circuit arrangement is the relatively low circuit-oriented outlay for the transmission of message cells via an ATM network designed for a lower transmission bit rate and for the sequentially correct recovery of message cells, taking different transit times of message cells within the ATM network into consideration.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

Figure 1:
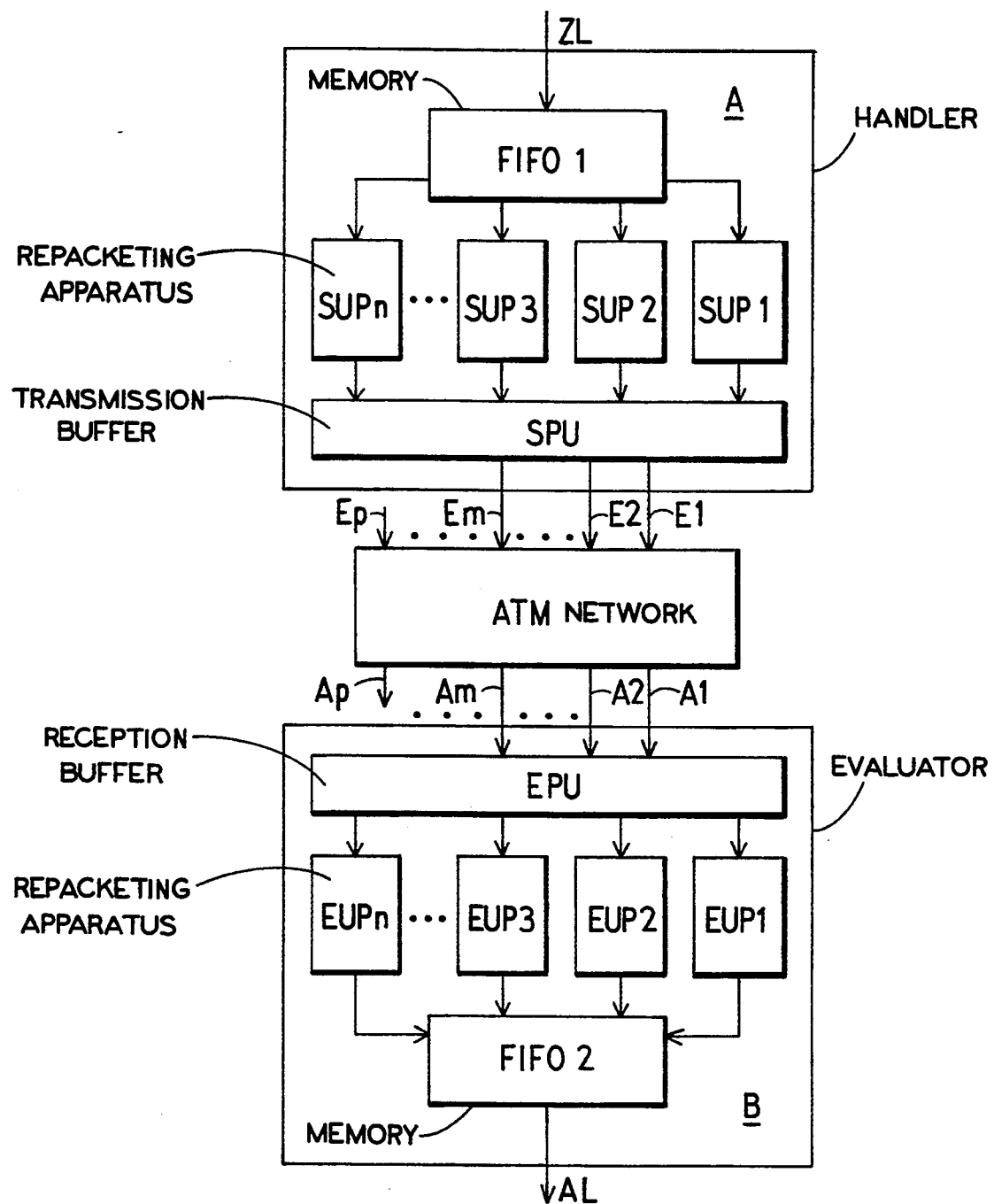
FIG. 1 is a schematic illustration of an ATM network wherein the invention is applied.

FIG. 1 schematically shows an ATM network operating according to an asynchronous transfer mode which has a plurality of inputs and a plurality of outputs. The inputs and outputs are thereby respectively designed for the input and output, respectively, of message cells having a cell header and an information part with a defined, maximum transmission bit rate. A handling means A that has its input side in communication with an offering trunk ZL is connected to at least a defined plurality of inputs E1, . . . ,Em. A transmission of message cells having a transmission bit rate that is higher in comparison to the transmission bit rate defined for the inputs and outputs ensues via this offering trunk. The plurality of inputs connected to the handling means A thereby corresponds to the bit rate ratio of the transmission bit rate defined for the offering trunk to the transmission bit rate defined for the inputs and outputs of the ATM network, taking auxiliary information that is yet to be set forth and that is to be transmitted within the ATM network into consideration.

In addition, an evaluation means B that has its output side connected to a serving trunk AL is connected to at least a defined plurality of outputs A1, . . . ,Am that are assumed to be allocated to the aforementioned inputs. The serving trunk is provided for the transmission of message cells that correspond to the afore-mentioned message cells appearing on the offering trunk ZL. The plurality of outputs thereby again correspond to the bit rate ratio of the transmission bit rate defined for the serving trunk to the transmission bit rate defined for these outputs, taking the auxiliary information into consideration.

The message cells appearing on the offering trunk ZL, which may be assumed to be allocated to n different virtual connections, are first introduced into a "first-in-first-out" memory FIFO1 within the handling means A. The message signals contained in message cells of a virtual connection are subsequently subdivided into signal sections and are inserted into newly formed message cells that are allocated to a defined virtual connection of the ATM network on the basis of a corresponding cell header and are distributed onto the inputs E1 through Em of the ATM network in a manner yet to be set forth below.

Figure 2:
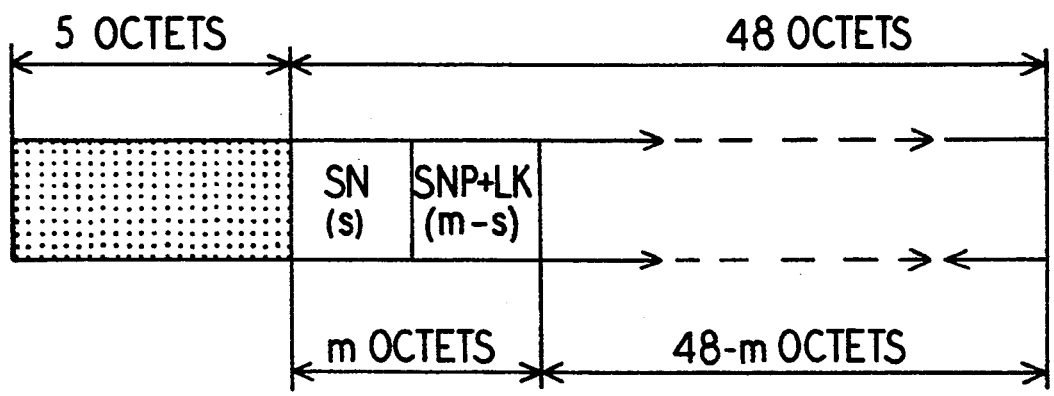
FIG. 2 is a diagram of a message cell used in the FIG. 1 embodiment.

These signal sections are defined in view of their bit plurality such that these signal sections, plus a defined plurality of information bits can be respectively transmitted in the information part of a message cell. Such a message cell is schematically shown in FIG. 2 and is composed, for example, of 53 octets, whereby the first five octets form a cell header ("header") in a known way which contains all control signals required for the transmission of the respective message cell via the ATM network. This cell header is followed by the information part of the message cell composed of 48 octets. These are m octets that form the aforementioned information bits. In this exemplary embodiment s of these m octets are provided for the transmission of a signal section sequence number SN (yet to be explained) but the remaining octets, i.e. (m−s) octets, are provided for the transmission of a check information SNP for the signal section sequence number as well as of a length indication LK for octets occupied as useful octets in the information part. Finally, the (48−m) octets of the information part are provided for the acceptance of an aforementioned signal section.

For the formation of new message cells, a separate repacketing means is allocated to each of the n virtual connections on the offering trunk ZL. In FIG. 1, n repacketing means SUP1 through SUPn are depicted. Proceeding from the "first-in-first-out" memory FIFO1, the respective repacketing means is thereby successively supplied with message cells based on the measure of the input sequence of the individual message cells, these message cells being first depacketed. These signal sections are subsequently formed of the sequence of message signals contained in these message cells. These signal sections are successively inserted into message cells of the respective virtual connection. A signal section sequence number that periodically continuously changes from message cell to message cell, a check information, as well as a length indicator are thereby entered into the information part of the respective message cell. The counting period for this signal section sequence number is defined according to the maximum transit time of a message cell through the ATM network.

The output lines of all repacketing means, SUP1 through SUPn are supplied in common to a transmission buffer means SPU that cyclically distributes the message cells appearing on the output lines to the inputs E1 through Em of the ATM network.

In addition, what are referred to as dummy cells are transmitted to the inputs E1 through Em of the ATM network coming into consideration by the transmission buffer means SPU upon appearance of transmission pauses on the output lines of the repacketing means.

The message cells supplied to the inputs E1 through Em proceeding from the transmission buffer mens SPU are transmitted to the outputs A1 through Am shown in FIG. 1 via defined transmission paths within the ATM network.

The evaluation means B that is connected to the outputs A1 through Am of the ATM network and that is shown in FIG. 1 has a reception buffer means EPU as interface to these outputs. This reception buffer means EPU forwards the message cells, that are supplied via the individual outputs and that belong to different virtual connections, to call-associated repacketing means. Corresponding to the n different virtual connections, repacketing means EUP1 through EUPn are depicted in FIG. 1. For this forwarding, the repacketing means EUP1 through EUPn are respectively connected via a connecting line to the reception buffer means EPU.

The respective repacketing means depackets the message cells supplied over the appertaining connecting line and joins the signal sections contained in these according to the signal section sequence numbers.

Message cells whose bit plurality is defined such that it respectively corresponds to the plurality of the bits transmitted in the information part of a message cell as useful signals, i.e. that the message signals in the example depicted in FIG. 2 cover 48 octets, are first formed by the respective repacketing means from the sequence of joined signal sections. The message cells are successively inserted into message cells of the respective virtual connection. These message cells are subsequently supplied to a "first-in-first-out" memory FIFO2 that forwards these to the serving trunk AL in the sequence of write-in.

Figure 3:
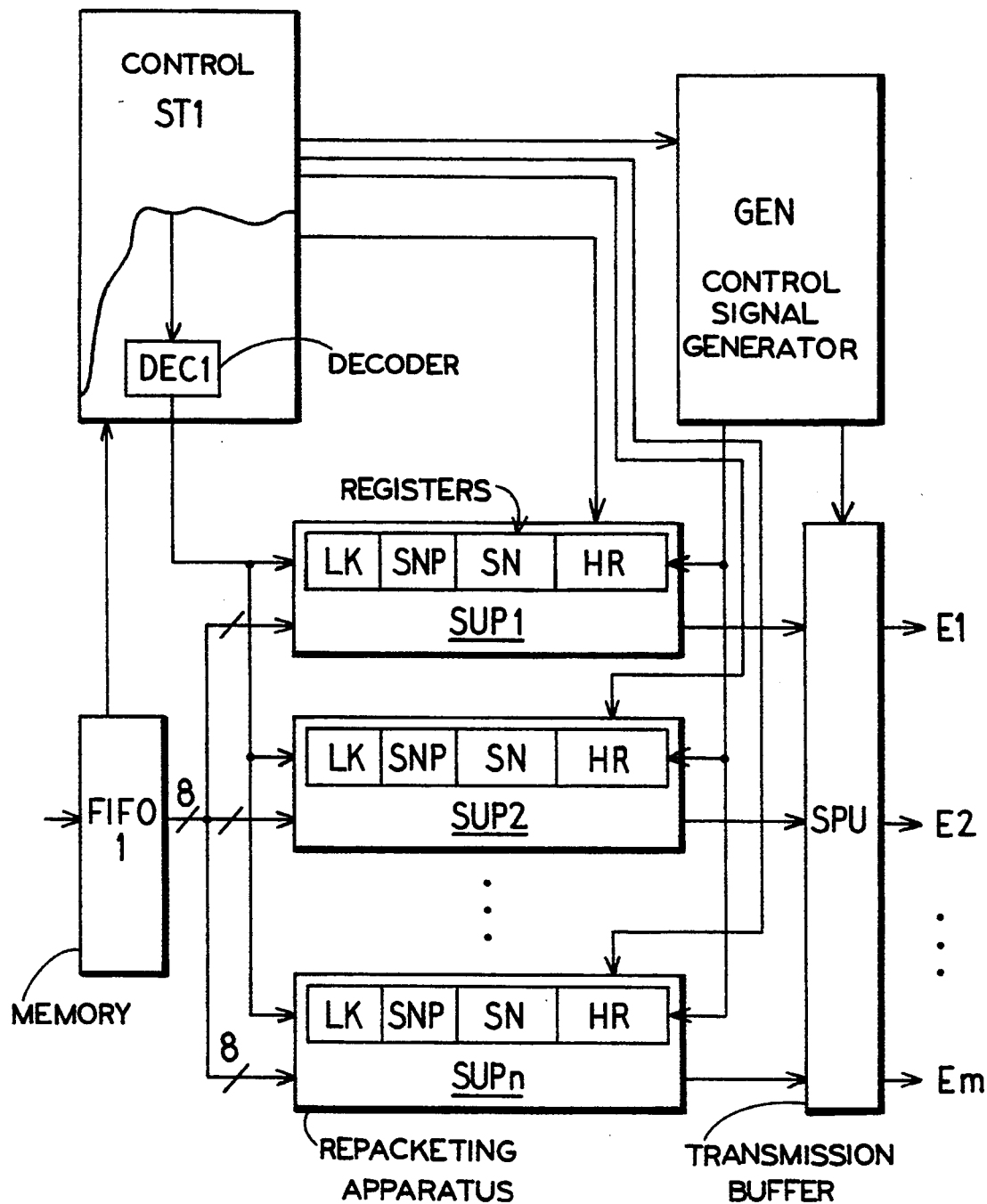
FIG. 3 depicts an embodiment of the repacketing equipment of the transmission side that is shown in FIG. 1.

The handling means A depicted in FIG. 1 is shown in greater detail in FIG. 3. The "first-in-first-out" memory FIFO1 is connected via a control line or via a control line bus to a control means ST1 which is provided by this first-in-first-out memory with the call particulars contained in the cell header of a message cell that is now on the output thereof. According to these call particulars, the repacketing means (SUP1, . . . ,SUPn) coming into consideration for the respective virtual connection is selected under the control of a decoder DEC1 of the control means to accept the respective message cell. For this purpose, the repacketing means are connected in common to, first, the "first-in-first-out" memory FIFO1 and, second, to the decoder DEC1.

For the acceptance of message cells, the repacketing means SUP1 through SUPn each respectively contain a memory. In addition, respectively four registers are provided in these repacketing means. A signal section sequence number that continuously changes from message cell to message cell is entered into a first register referenced SN by the respective repacketing means. A second register SNP is provided for the acceptance of the appertaining check information. A third register referenced HR serves the purpose of storing a defined cell header output proceeding from the control means ST1. Dependent on the requirements of the ATM network, this cell header can thereby be identical to the cell header used on the offering trunk ZL or can deviate therefrom. For the acceptance of the new cell header to be used by the individual repacketing means, these are respectively connected via a separate control line or via a separate control line bus to the control means ST1. A fourth of the registers that is referenced LK in FIG. 3, finally, serves the purpose of accepting a length indicator that has already been mentioned above.

The supplied message cells are depacketed by the individual repacketing means SUP1 through SUPn and the message signals contained therein are successively entered into the appertaining memory. The afore-mentioned signal sections are formed from these message cells, the information stored in the appertaining, four registers according to FIG. 2 respectively preceding these. A length indicator which, in the example assumed in FIG. 3, corresponds to the 48−m octets of the information part of a message cell is used for immediately succeeding signal sections and, thus, new message cells in the usual case. However, the case can also arise that only parts of a signal section are stored in the appertaining memory due to transmission pauses during the course of the respective virtual connection on the offering trunk ZL for a specific time. When this condition is present for a defined time, then the existing parts of a signal section are inserted into a message cell, whereby the plurality of octets required for this purpose is indicated in the appertaining information part by a corresponding length indicator.

The formation of new message cells in the individual repacketing means SUP1 through SUPn, moreover, ensues under the control of a control signal generator GEN that is in communication for this purpose with the repacketing means via a control line or a control line bus.

The outputs of the repacketing means SUP1 through SUPn are connected to inputs of the transmission buffer means SPU that, under the control of the control signal generator GEN, cyclically distributes the message cells supplied to it onto the inputs E1 through Em of the ATM network.

Figure 4:
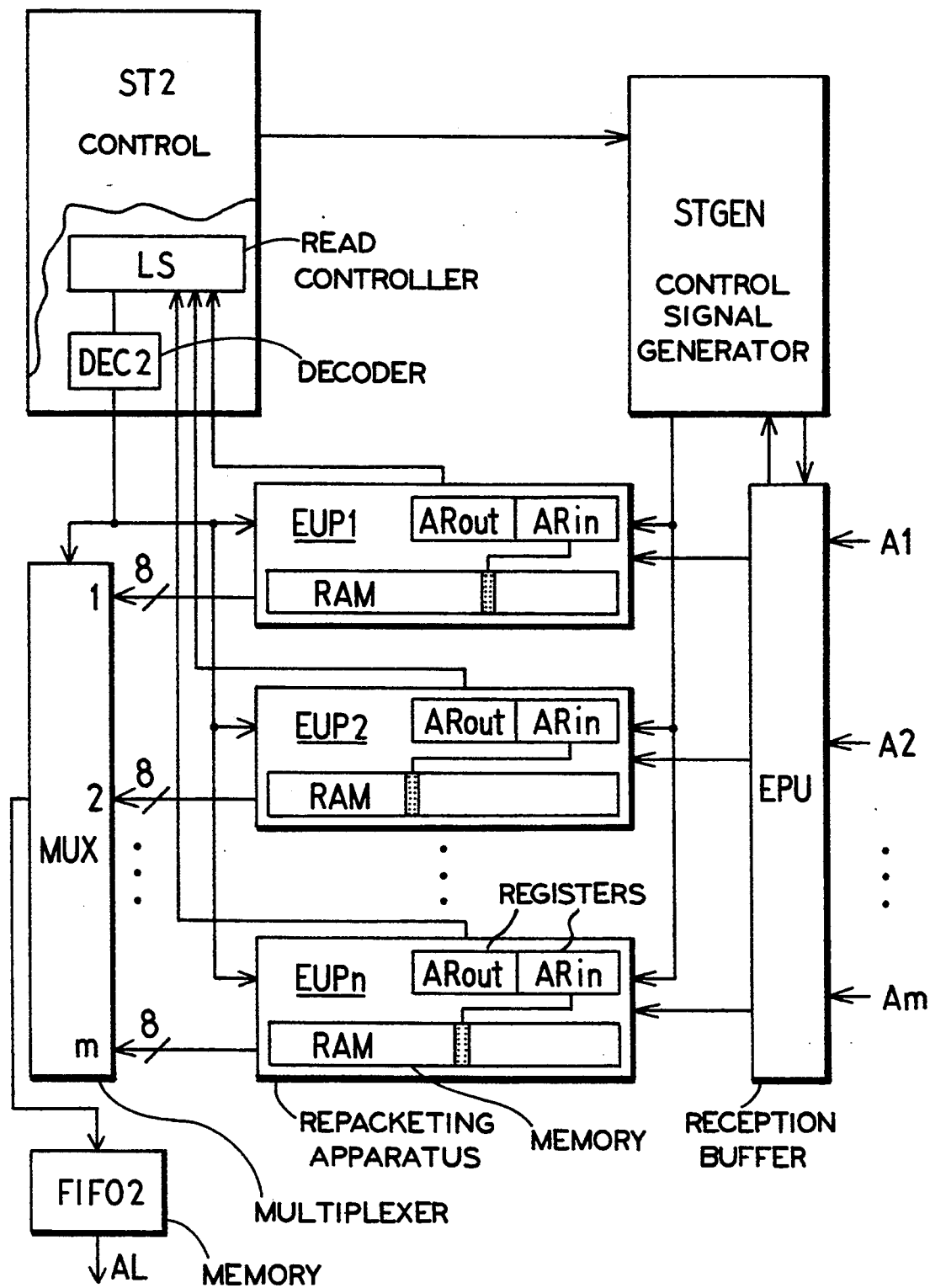
FIG. 4 depicts an embodiment of a repacketing equipment of the reception side that is merely schematically shown in FIG. 1.

The evaluation means B depicted in FIG. 1 is shown in greater detail in FIG. 4. The reception buffer means EPU is supplied with the message cells transmitted via the outputs A1 through Am of the ATM network. After a check of the signal section sequence number respectively contained in them, these message cells are forwarded to the call-associated repacketing means EUP1 through EUPn on the basis of the appertaining check information according to the measure of the call particulars respectively contained in the cell headers of these message cells. This, for example, can occur in that the reception buffer means EPU transmits the call particulars of the respective message cell to a control signal generator STGEN that, according to these call particulars, enables the repacketing equipment coming into consideration via a control line or control bus arrangement for the acceptance of the respective message cell that is shared in common by all repacketing means.

A depacketing of the message cells respectively ensues first in the repacketing means, whereby the signal sections contained in these message cells are entered into memory locations of a random access memory RAM belonging to the respective repacketing means. The signal section sequence number belonging to the respective signal section is thereby used as memory address for the respective signal section, this being entered into a write address register ARin of the respective repacketing means.

Moreover, the length indicators belonging to the signal sections are also entered into the individual memory locations of the random access memory RAM.

Successive message cells having the above-recited size are formed from the signal sections stored in the appertaining random access memory RAM by the respective repacketing means (EUP1 through EUPn), taking the length indicators stored with the signal sections into consideration, these message signals having this size being successively entered into message cells of the respective virtual connection. The cell header required for these message cells is thereby stored in the respective repacketing means. Over and above this, the start address within the random access memory RAM for the formation of message cells now to be inserted into a message cell is retained in a read address register ARout of the respective repacketing means. This start address is updated with every formation of a message cell.

Given the presence of a message cell which, for example, may be assumed to be intermediately stored in an output register of the respective repacketing means, the respective repacketing means outputs an indictor signal to a read controller LS of a control means ST2. In response to such an indicator signal, a decoder DEC2 connected to the read controller LS drives the respective repacketing means to output the message cell that is present at the moment. The outputs of the repacketing means EUP1 through EUPn are thereby connected to the inputs of a multiplexer Mux that is likewise controlled by the decoder DEC2 and via which the individually output message cells are supplied to the "first-in-first-out" memory FIFO2. Proceeding from the latter, a forwarding of the message cells to the serving trunk AL then ensues, namely taking the write-in sequence of these message cells into consideration.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for transmitting message cells which are respectively formed of a cell header having an identifier for a virtual connection and of an information part and which appear during the course of at least one virtual connection with a first transmission bit rate via an ATM network that operates according to an asynchronous transfer mode (ATM), the ATM network having a plurality of internal inputs and a plurality of internal outputs, whereby the internal inputs and internal outputs are respectively designed for input and output, respectively, of message cells with a second transmission bit rate, the second transmission bit rate being less than the first transmission bit rate, comprising the steps of:

subdividing first message signals contained in the message cells with the first transmission bit rate into successive signal sections, each of the signal sections having a first bit plurality that is uniformly defined such that the first bit plurality plus a defined plurality of information bits corresponds to a plurality of bits transmittable in the information part of a message cell with the second transmission bit rate as a useful signal;

successively inserting the signal sections into the information parts of the message cells with the second transmission bit rate and entering a continuously changing signal section sequence number into the information parts as information bits;

successively distributing the message cells with the second transmission bit rate onto a plurality of inputs of the ATM network that corresponds in number to a number of a bit rate ratio of the first transmission bit rate to the second transmission bit rate, the message cells with the second transmission bit rate being transmitted via the appertaining inputs to outputs of the ATM network allocated to these inputs of the ATM network;

removing a respective signal section respectively contained in the message cells with the second transmission bit rate appearing at the appertaining outputs as well as a respective signal section sequence number appertaining thereto from the message cells with the second transmission bit rate appearing at the appertaining outputs of the ATM network;

forming second message signals whose bit plurality is defined such that this bit plurality respectively corresponds to the plurality of bits transmittable in the information part of a message cell with the first transmission bit rate as useful signals from the sequence of the signal sections for the respective virtual connection; and subsequently successively inserting the second message signals into message cells that are associated with the respective virtual connection and that are forwarded with the first transmission bit rate.

2. The method according to claim 1, wherein the method further comprises entering check information for checking for an error-free transmission and a length indicator for indicating a length of a respective signal section contained in a respective information part into the information parts of the message cells with the second transmission bit rate as respective information bits, the respective information bits being entered in addition to a signal section sequence number.

3. A circuit arrangement for the transmission of message cells comprising:

an ATM network operationally connected to at least one offering trunk, via which message cells of at least one virtual connection are transmittable with a first transmission bit rate, and operationally connected to at least one serving trunk for forwarding of message cells with the first transmission bit rate, the ATM network having a plurality of internal inputs and a plurality of internal outputs which are designed for input and output, respectively, of message signals in the form of message cells containing a cell header and an information part with a second transmission bit rate, the second transmission bit rate being less than the first transmission bit rate;

at least one handling means connected to the offering trunk and to the plurality of internal inputs of the ATM network which corresponds in number to a number of a bit rate ratio of the first transmission bit rate to the second transmission bit rate;

the handling means having a plurality of first repacketing means individually allocated to the virtual connections available to the handling means and to which the message cells with the first transmission bit rate of the appertaining virtual connection are respectively supplied;

a respective first repacketing means thereby depacketing the message cells with the first transmission bit rate and forming signal sections from a sequence of first message signals contained in the message cells with the first transmission bit rate, these signal sections, together with a signal section sequence number that changes from signal section to signal section being respectively inserted into the information part of a message cell with the second transmission bit rate and these message cells with the second transmission bit rate being distributed onto the appertaining internal inputs of the ATM network in a defined sequence;

at least one evaluation means connected to the serving trunk and to the plurality of internal outputs of the ATM network that is allocated to said plurality of internal inputs and corresponds to the appertaining bit rate ratio;

the evaluation means having a plurality of call-associated second repacketing means connected to the appertaining internal outputs of the ATM network; and each of the second repacketing means having a random access memory, a respective second repacketing means taking a signal section as well as a signal section sequence number respectively contained in message cells with the second transmission bit rate supplied via the internal outputs of the ATM network from the message cells with the second transmission bit rate of the respective virtual connection supplied via the internal outputs of the ATM network and first intermediately storing a respective signal section in a respective random access memory under a write address corresponding to the appertaining signal section sequence number;

wherein second message signals formed by a respective repacketing means from the sequence of the signal sections stored in the appertaining random access memory being inserted into the information parts of message cells with the first transmission bit rate of the respective virtual connection, the memory cells with the first transmission bit rate being forwarded to the serving trunk.

4. A circuit arrangement for the forwarding of primary message cells having a first transmission bit rate from an offering trunk to a serving trunk, comprising:

an ATM network having a plurality of internal inputs and a plurality of internal outputs for respectively inputting and outputting secondary message cells having a second transmission bit rate, said second transmission rate being less than said first transmission rate;

each of said primary message cells and said secondary message cells having a cell header containing an identifier for a virtual connection via said ATM network and an information part;

at least one handling means connected to said offering trunk and to said plurality of said internal inputs of said ATM network, said at least one handling means having a plurality of first repacketing means individually allocated to virtual connections of the ATM network and to which the primary message cells of the appertaining virtual connection are respectively supplied, wherein a respective repacketing means thereby depackets primary message cells and forming signal sections from a sequence of first message signals contained in the primary message cells, these signal sections, together with a signal section sequence number changing from signal section to signal section being respectively inserted into the information part of a respective secondary message cell and secondary message cells being distributed onto the internal inputs of the ATM network in a defined sequence;

at least one evaluation means connected to said serving trunk and to said plurality of internal outputs of said ATM network, said evaluation means having a plurality of second repacketing means individually allocated to said virtual connections of said ATM network, each of said second repacketing means having a random access memory, wherein a respective repacketing means takes a signal section and an associated signal section sequence number, that are respectively contained in the secondary message cells supplied via the internal outputs of the ATM network for a respective virtual connection and intermediately stores a respective signal section in a respective random access memory under a write address corresponding to the associated signal section sequence number, and wherein message signals are formed by respective repacketing means from a sequence of the signal sections stored in respective random access memories, said message signals being inserted into information parts of further primary message cells corresponding to the respective virtual connection, the further primary message cells being forwarded to the serving trunk.

5. The circuit arrangement according to claim 4, wherein each of said first repacketing means has an input and an output, and wherein said handling means has an input memory connected to said offering trunk and to said inputs of said plurality of first repacketing means, has a transmission buffer connected to said plurality of internal inputs of said ATM network and to said outputs of said plurality of first repacketing means, and has control means, connected to said input memory, said plurality of first repacketing means and said transmission buffer, for receiving said primary message cells, for forming said secondary message cells and for outputting said secondary message cells to said ATM network.

6. The circuit arrangement according to claim 5, wherein said input memory is a first-in-first-out memory.

7. The circuit arrangement according to claim 5, wherein said transmission buffer cyclically distributes the secondary message cells onto said internal inputs of said ATM network.

8. The circuit arrangement according to claim 4, wherein each of said second repacketing means has an input, an output and a random access memory, and wherein said evaluation means has a reception buffer connected to said plurality of internal outputs of said ATM network and to said inputs of said plurality of second repacketing means, has a multiplexer having a plurality of inputs respectively connected to said outputs of said plurality of second repacketing means and having an output, has an output memory connected to said serving trunk and to said output of said multiplexer, and has control means, that are connected to said reception buffer, to said plurality of second repacketing means, and to said multiplexer for receiving said secondary message cells, for forming said further primary memory cells and for outputting said further primary message cells to said serving trunk.

9. The circuit arrangement according to claim 8, wherein said output memory is a first-in-first-out memory.

* * * * *